US009256495B2

(12) United States Patent
Sano et al.

(10) Patent No.: US 9,256,495 B2
(45) Date of Patent: Feb. 9, 2016

(54) PROCESSING UNIT AND ERROR PROCESSING METHOD

(71) Applicant: Kabushiki Kaisha Toshiba, Minato-ku, Tokyo (JP)

(72) Inventors: Toru Sano, Kawasaki (JP); Takashi Miyamori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 152 days.

(21) Appl. No.: 14/199,105

(22) Filed: Mar. 6, 2014

(65) Prior Publication Data

US 2014/0289556 A1 Sep. 25, 2014

(30) Foreign Application Priority Data

Mar. 25, 2013 (JP) .................................. 2013-062557

(51) Int. Cl.
*G06F 11/00* (2006.01)
*G06F 11/14* (2006.01)
*G06F 11/10* (2006.01)

(52) U.S. Cl.
CPC .......... *G06F 11/141* (2013.01); *G06F 11/1048* (2013.01)

(58) Field of Classification Search
CPC ............................ G06F 11/141; G06F 11/1048
USPC ............................... 714/49, 48, 47.3, 50, 47.1
See application file for complete search history.

(56) References Cited

U.S. PATENT DOCUMENTS

| 6,519,717 | B1 * | 2/2003 | Williams ............ G06F 11/0724 714/37 |
| 7,277,346 | B1 * | 10/2007 | Rahim ................... G11C 17/18 326/10 |
| 7,415,638 | B2 | 8/2008 | Smith et al. |
| 8,683,290 | B2 | 3/2014 | Koshiyama et al. |
| 8,856,614 | B2 | 10/2014 | Yamashita |

(Continued)

FOREIGN PATENT DOCUMENTS

| JP | H02-202655 A | 8/1990 |
| JP | 2003-177934 | 6/2003 |

(Continued)

OTHER PUBLICATIONS

Notification of Rejection mailed by the Japan Patent Office on Jul. 21, 2015 in Japanese Patent Application No. 2013-062557 (to which the instant application claims priority), 19 pages.

*Primary Examiner* — Dieu-Minh Le
(74) *Attorney, Agent, or Firm* — Knobbe, Martens, Olson & Bear, LLP

(57) ABSTRACT

A processing unit of the embodiments includes an instruction memory that holds a plurality of instructions specified by addresses, and that cannot execute read and write operations concurrently, an error correction circuit that detects and corrects an error in the instruction, a program counter, an instruction buffer that holds the instruction corrected as a corrected instruction, a program counter buffer that holds an address of the instruction where an error has been detected, a selector that selects and outputs any of the output of the error correction circuit and the output of the instruction buffer, and a control unit that controls the read and write of the instruction specified by the address from and into the instruction memory. The control unit writes the corrected instruction in the instruction memory using an address held in the program counter buffer when a predetermined condition is satisfied after the occurrence of the error.

20 Claims, 8 Drawing Sheets

(56) References Cited

U.S. PATENT DOCUMENTS

| | | | | |
|---|---|---|---|---|
| 2002/0004925 A1* | 1/2002 | Kodama | ............... | G11B 20/18 714/770 |
| 2005/0097293 A1* | 5/2005 | Hayashi | ............... | G11B 20/10 711/169 |
| 2007/0150780 A1* | 6/2007 | Shimooka | ............ | G06F 1/3203 714/726 |
| 2011/0107143 A1 | 5/2011 | Nakatsuka | | |
| 2011/0119558 A1 | 5/2011 | Koshiyama et al. | | |

FOREIGN PATENT DOCUMENTS

| | | |
|---|---|---|
| JP | 2008-521141 | 6/2008 |
| JP | 2011-108306 A | 6/2011 |
| JP | 2012-198954 A | 10/2012 |
| WO | WO 2006/057907 | 6/2006 |

* cited by examiner

US 9,256,495 B2

PROCESSING UNIT AND ERROR PROCESSING METHOD

CROSS-REFERENCE TO RELATED APPLICATIONS

This application is based upon and claims the benefit of priority from Japanese Patent Application No. 2013-062557, filed on Mar. 25, 2013; the entire contents of which are incorporated herein by reference.

FIELD

The embodiments of the present invention relate to a processing unit and an error processing method.

BACKGROUND

Instruction data of a processor is read from an SRAM at a level in a memory hierarchy that is closest to an arithmetic pipeline. With the objective of preventing the execution of an illegal instruction by things such as a soft error occurred in the SRAM, syndrome bits are added to implement an Error Correcting Code (ECC) circuit that detects and corrects the occurrence of an error in the data.

Meanwhile, an arithmetic path length of a circuit for the generation of FCC syndrome bits and for detection and correction with its result tends to be longer than an operation cycle of the pipeline, and the operation frequency of an entire block is limited. Hence, it is conceivable that the ECC circuit is divided into stages. However, one or more cycles are required upon error correction, and corrected data is written back into the SRAM to prevent the accumulation of errors. Accordingly, a situation where instructions cannot be continuously provided into the pipeline arises, which results in reduction in an instruction execution throughput.

DETAILED DESCRIPTION

A processing unit of one embodiment of the present invention includes an instruction memory that holds a plurality of instructions specified by addresses, and that cannot execute read and write operations concurrently, an error correction circuit that detects and corrects an error in the instruction read from the instruction memory, a program counter that specifies the address of instruction memory, an instruction buffer that holds the instruction corrected by the error correction circuit as a corrected instruction, a program counter buffer that holds an address of the instruction where an error has been detected in the error correction circuit, a selector that selects and outputs one of an output of the error correction circuit and the output of the instruction buffer, and a control unit that controls the read and write of the instruction specified by the address from and into the instruction memory. The control unit writes the corrected instruction in the instruction memory using an address held in the program counter buffer when a predetermined condition is satisfied after the occurrence of a first error.

Figure 1:
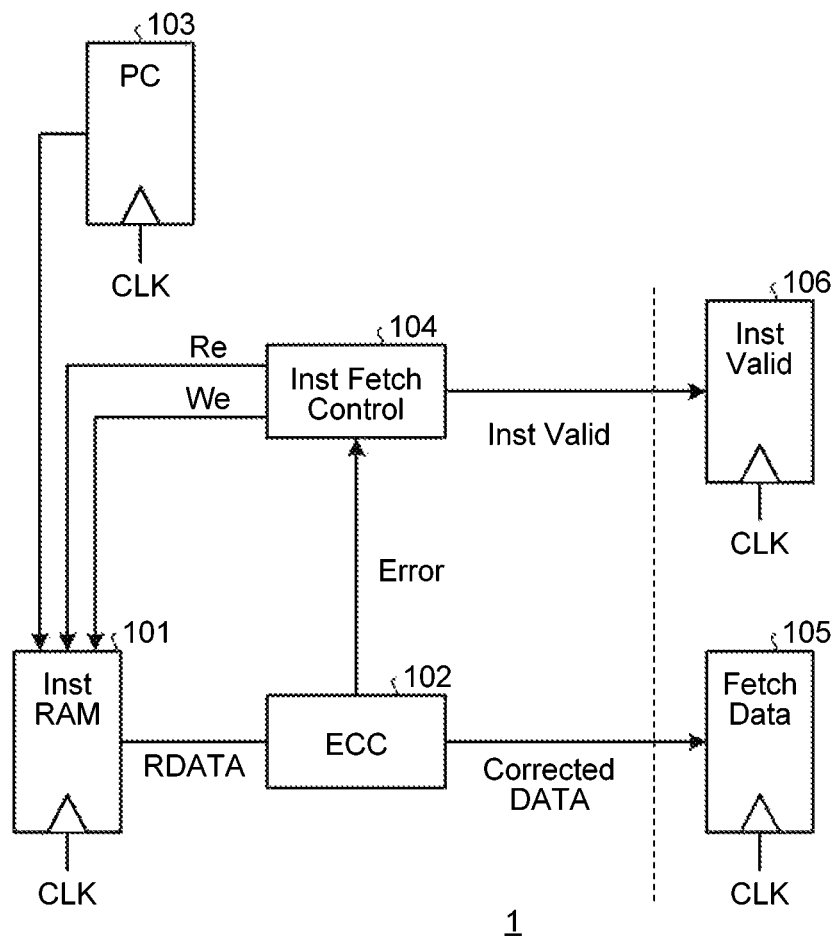
FIG. 1 is a diagram illustrating a circuit block of an instruction fetch stage (Instruction Fetch Stage) of a processor (central processing unit) having a pipeline structure according to the embodiments.

FIG. 1 illustrates a circuit block of an instruction fetch stage (Instruction Fetch Stage) 1 of a processor (central processing unit) having a pipeline structure. The instruction fetch stage 1 is configured of an instruction RAM (Inst RAM) 101 that holds an instruction on an address-by-address basis, an ECC circuit 102 that detects a bit error in data read from the instruction. RAM 101 and corrects the error, a PC (Program Counter) 103 that indicates an address of an instruction to be read from the instruction RAM 101, and an instruction fetch control unit (Inst Fetch Control) 104 that controls reading and insertion of an instruction from the instruction RAM 101 and into a pipeline. The instruction RAM 101 is, for example, a single-port SRAM, and is exclusively used for reading (Read) and writing (Write). In other words, the instruction RAM 101 cannot handle read and write operations in the same clock cycle. Moreover, the ECC circuit 102 is configured to require one cycle for the detection of an error and less than two cycles for its correction. Additionally, a subsequent stage of the instruction fetch stage 1 in the pipeline includes a fetched data holding unit (Fetch Data) 105, and an instruction valid signal holding unit 106 that holds an instruction valid signal (Inst Valid) indicating whether or not a read instruction is valid.

Figure 2:
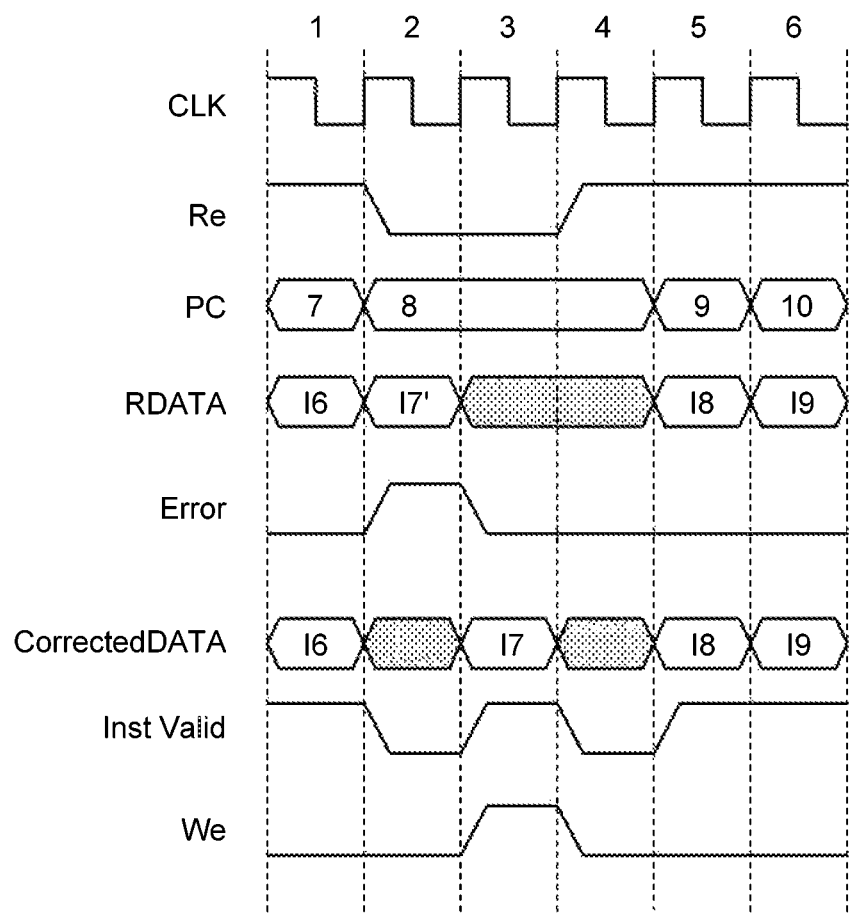
FIG. 2 is a diagram illustrating a timing chart of the instruction fetch stage illustrated in FIG. 1.

FIG. 2 is a diagram illustrating an example of a timing chart of the instruction fetch stage illustrated in FIG. 1. Hereinafter, cycles per clock cycle are in turn called a first cycle, a second cycle, .... The PC 103 is updated in accordance with the clock operation, and an instruction at an address (PC) pointed by the PC 103 is read to perform an operation. In the example of FIG. 2, assume that a correctable error occurs in an instruction (I7') pointed by PC=7 in the first cycle. Then, the insertion of the instruction into the pipeline in the second cycle is held by deasserting (deactivating) the instruction valid signal (Inst Valid) for one cycle, and a corrected instruction (I7) of the next cycle (third cycle) is waited for and inserted in the subsequent stage of the pipeline. Moreover, in order to avoid the accumulation of errors, a write enable signal (We: Write enable) is asserted (activated) by the instruction fetch control unit 104 in the third cycle. The corrected instruction (I7) is written into the instruction RAM 101. A read enable signal (Re: Read enable) is deasserted in the second and third cycles, and read cannot be performed on the instruction RAM 101. Accordingly, the instruction cannot be inserted in the subsequent stage also in the fourth cycle. Therefore, the pipeline is stalled for two cycles in total in this example.

In this manner, corrected data is written hack on single-port hardware and then the performance deteriorates. The dual port-memory solves the problem, but the size of hardware and power consumption increase.

Hereinafter, a detailed description will be given of a processing unit and an error processing method according to the embodiments with reference to the accompanying drawings. The present invention shall not be limited by the embodiments.

First Embodiment

Figure 3:
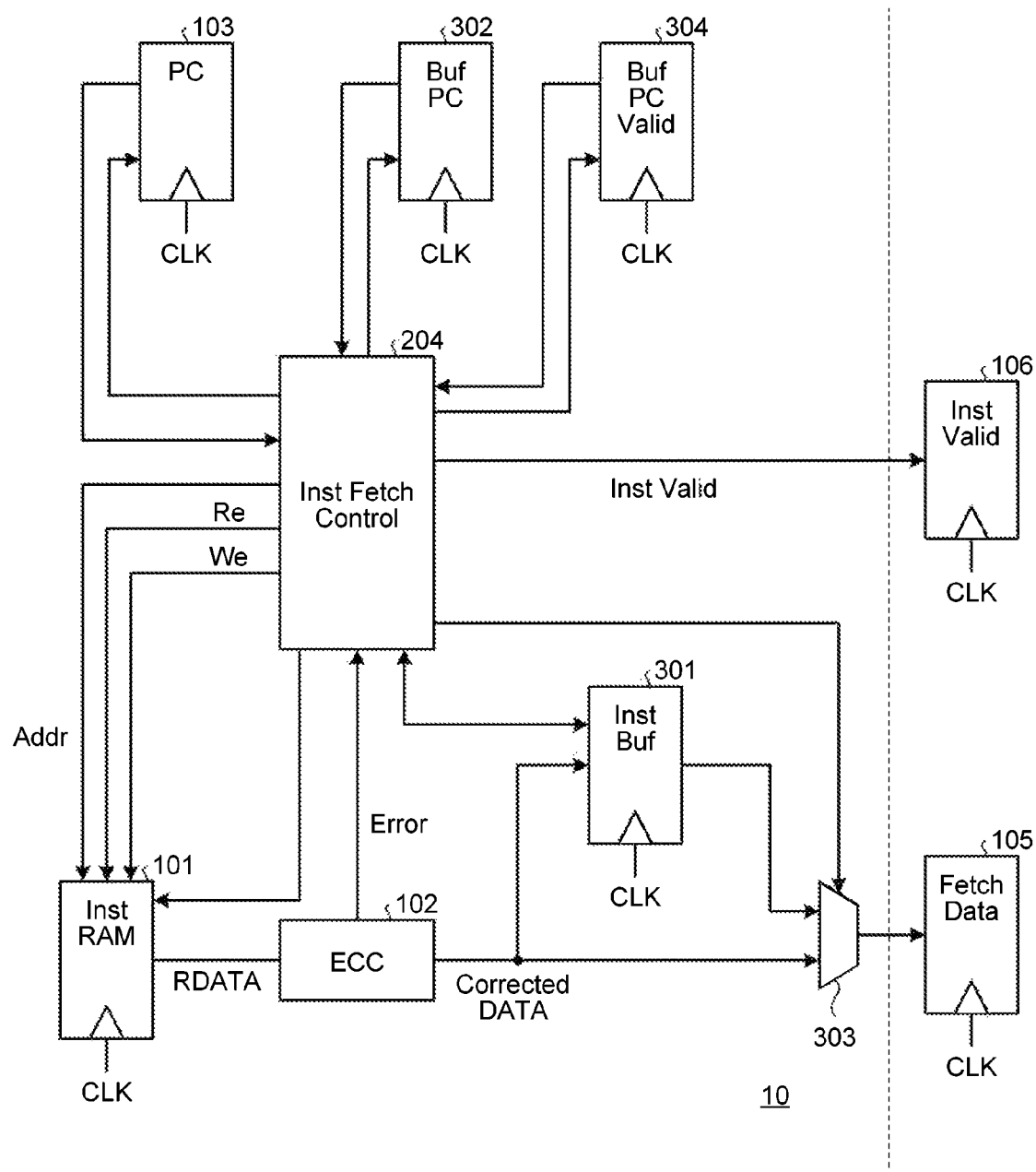
FIG. 3 is a circuit block of an instruction fetch stage of a processor having a pipeline structure according to a first embodiment.

FIG. 3 is a circuit block of an instruction fetch stage 10 of a processor having a pipeline structure according to a first embodiment. The instruction fetch stage 10 uses a single-port SRAM as the instruction RAM 101 as in the instruction fetch stage 1 of FIG. 1, but an instruction buffer (Inst Buf) 301 as a register that temporarily holds a corrected instruction, a PC buffer (Buf PC) 302 (a program counter buffer) as a register that holds an address of the PC 103 corresponding to the instruction, a selector 303 that selects either a normal output of the ECC circuit 102 or the result of the instruction buffer 301, and a PC buffer valid (Buf PC Valid) register 304 that holds as a state whether or not to be in a valid state where the address of the PC 103 where an ECC error has occurred is stored in the PC buffer 302 are added to the instruction fetch stage 1. Moreover, an instruction fetch control unit 204 of the instruction fetch stage 10 includes a read enable signal (Re) generation unit and a write enable signal (We) generation unit, but the operation is different from the instruction fetch control unit 104 of FIG. 1 as described below. The instruction buffer 301 is a register with the same bit width as an instruction, and the PC buffer 302 is a register with the same bit width as the PC 103.

Figure 4:
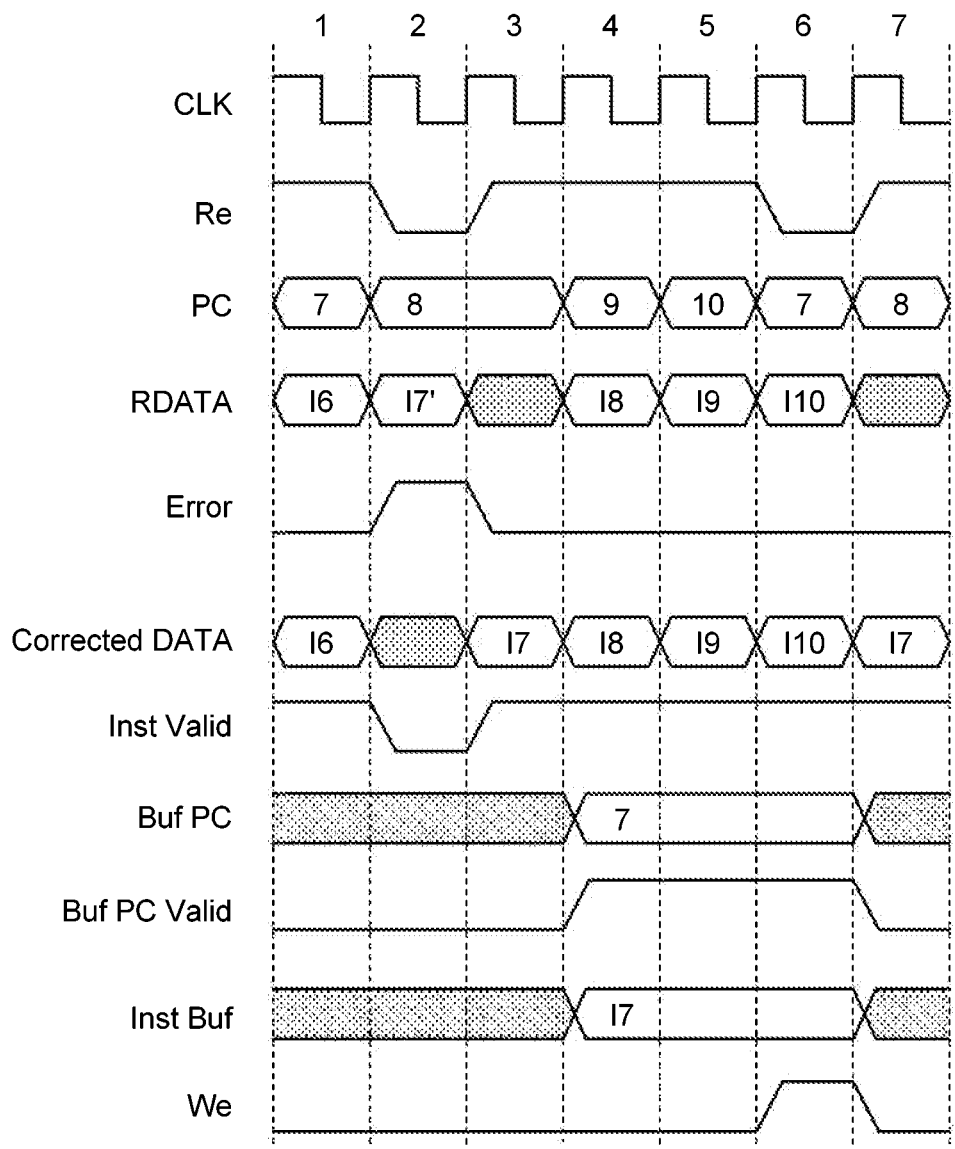
FIG. 4 is a diagram illustrating an example of a timing chart of the instruction fetch stage according to the first embodiment.

Normally, in a state where an error is not detected, the selector 303 transmits corrected data (Corrected DATA) from the ECC circuit 102 to the fetch data holding unit 105 as it is as instruction fetch data, and the instruction valid signal (Inst Valid) is also kept to be asserted. FIG. 4 is a diagram illustrating an example of a timing chart of the instruction fetch stage 10 according to the embodiment. The operation after the detection of an error will be described with reference to FIG. 4. Assume that an error occurred in the instruction represented by the value of PC=7 in the first cycle. If the ECC circuit 102 asserts an error signal (Error) by reading in the second cycle, the instruction valid signal (Inst Valid) is deasserted regarding an instruction in the cycle to be illegal. Moreover, in the second cycle, the read enable signal (Re: Read enable) is also deasserted. In the third cycle, the false instruction (I7') of PC=7 is corrected into the correct instruction (I7) by the ECC circuit 102 and outputted. Therefore, the instruction valid signal (Inst Valid) is asserted again, and a read operation of the instruction is also resumed. At this cycle, the corrected instruction (I7) is not written back into the instruction RAM 101 in the fourth cycle, and is held in the instruction buffer 301 in the fourth cycle. Furthermore, the PC buffer 302 holds "7" being the value of the PC in error. From this cycle, the pipeline operation is continued in the fourth and fifth cycles. However, when read of PC=7, which may occur normally in the loop operation in the micro processor, occurs again in the sixth cycle, the instruction fetch control unit 204 determines that the address of the PC 103 and the address of the PC buffer 302 agree since the value of the PC buffer 302 is "7." The instruction fetch control unit 204 asserts the write enable signal (We: Write enable) in the sixth cycle. Consequently, in the seventh cycle, the instruction fetch control unit 204 operates the selector 303, not to read from the ECC circuit 102, and inserts the instruction held in the instruction buffer 301 into the fetch data holding unit 105 being the subsequent stage of the pipeline. In this cycle, the content of the instruction buffer 301 is written into the instruction RAM 101 using a fact that the instruction RAM 101 is not used for reading at this cycle. In the embodiment, "I8" is enabled in the fourth cycle to be inserted into the pipeline as corrected data (Corrected DATA), which is one cycle earlier than FIG. 2.

Figure 6:
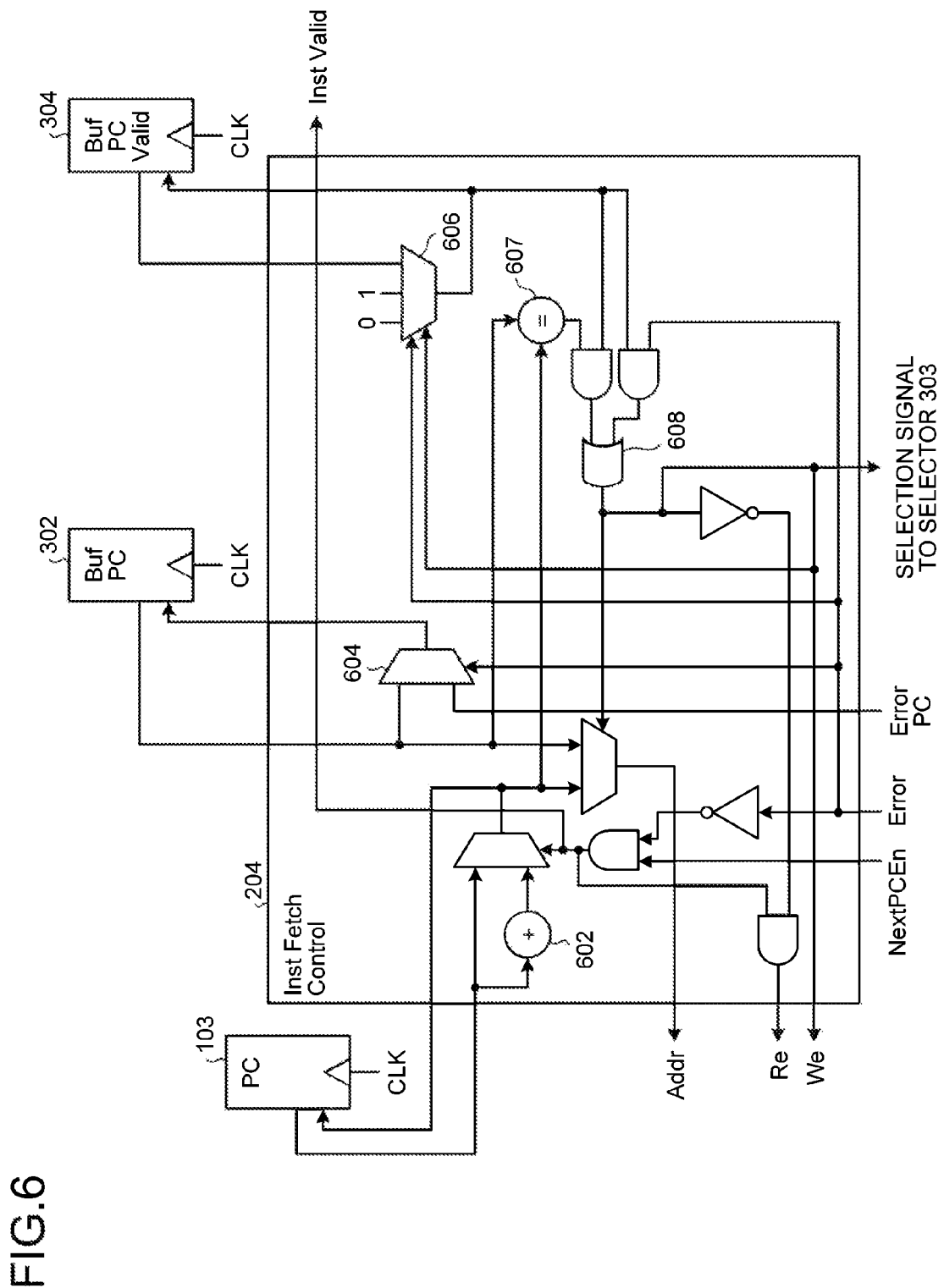
FIG. 6 is a diagram illustrating a detailed configuration of an instruction fetch control unit according to the first and second embodiments.

FIG. 6 illustrates a detailed configuration of the instruction fetch control unit 204. The output control of an address signal (Addr), the read enable signal (Re), and the write enable signal (We) by the instruction fetch control unit 204 will be described with reference to FIG. 6. The value of the PC 103 is controlled to cause an incrementer 602 to read the next instruction when the error signal (Error) from the ECC circuit 102 is not asserted and a control signal "NextPCEn," which is asserted when the operation of the processor is valid, is asserted. Tf the error signal (Error) is asserted in the second cycle of FIG. 4, the PC 103 is held with the current value. Moreover, when the error signal (Error) is asserted, the selector 604 stores a PC error signal (ErrorPC) in the PC buffer 302 and a selector 606 sets the value of the PC buffer valid register 304 (Buf PC Valid) to 1 in the fourth cycle. Accordingly, a state which indicates that the PC in ECC error is stored in the PC buffer 302 is held. The PC error signal (ErrorPC) being the address in error may be generated by the ECC circuit 102, but the FCC circuit 102 may not deal with the address, and the PC error signal (ErrorPC) may be a signal from another circuit of the instruction fetch stage 10.

If the instruction represented by the PC=7 is read, for example, in the sixth cycle when Buf PC Valid=1, and the value of the PC buffer 302 agrees with the value of the PC, logical disjunction of the output of a comparator 607 that took the agreement between the value of the PC buffer 302 and the value of PC and the error signal (Error) is taken by a logical disjunction circuit 608, the value of the PC buffer 302 is output as the address signal (Addr) to the instruction RAM 101, the write enable signal (We) is asserted in the same sixth cycle, and the corrected instruction data is written into the instruction RAM 101. Moreover, the output of the logical disjunction circuit 608 also serves as a selection signal of the selector 303. With the write, the value of the PC buffer valid register 304 (Buf PC Valid) is returned to 0 by the selector 606. In other conditions, the value of the PC buffer valid register 304 (Buf PC Valid) holds the current value. Buf PC Valid changes as illustrated in FIG. 4. The condition that the read enable signal (Re) can be asserted requires that there is no error signal (Error) and the read of the next instruction is valid. And the condition further requires that Buf PC Valid=0, or that the addresses held in the PC and the PC buffer 302 do not agree even if Buf PC Valid=1.

The instruction fetch stage 10 according to the embodiment writes an instruction after error correction into the buffer, and writes the corrected instruction held in the buffer back into the memory upon reading of the same instruction to avoid the accumulation of errors. Consequently, even if a single-port SRAM remains to be used as the instruction RAM, a pipeline stall cycle per error-occurred instruction, which has conventionally required two cycles, can be reduced to one cycle. In other words, if a write-back operation is performed to avoid the accumulation of errors, assuming the worst case where an error occurs in the same address every time, a pipeline stall for cycles twice as many as the number of errors occurs at the instruction fetch stage 1 of FIG. 1, but it becomes possible to suppress a pipeline stall to cycles equivalent to the number of errors, which is half the number of cycles in the instruction fetch stage 10 according to the embodiment.

Second Embodiment

An instruction fetch stage according to the embodiment is the same as the instruction fetch stage 10 of FIG. 3. The first embodiment describes an operation upon later rereading an instruction where an error has occurred once and has been corrected, but the embodiment describes an operation upon occurrence of an error in another instruction and its correction.

Figure 5:
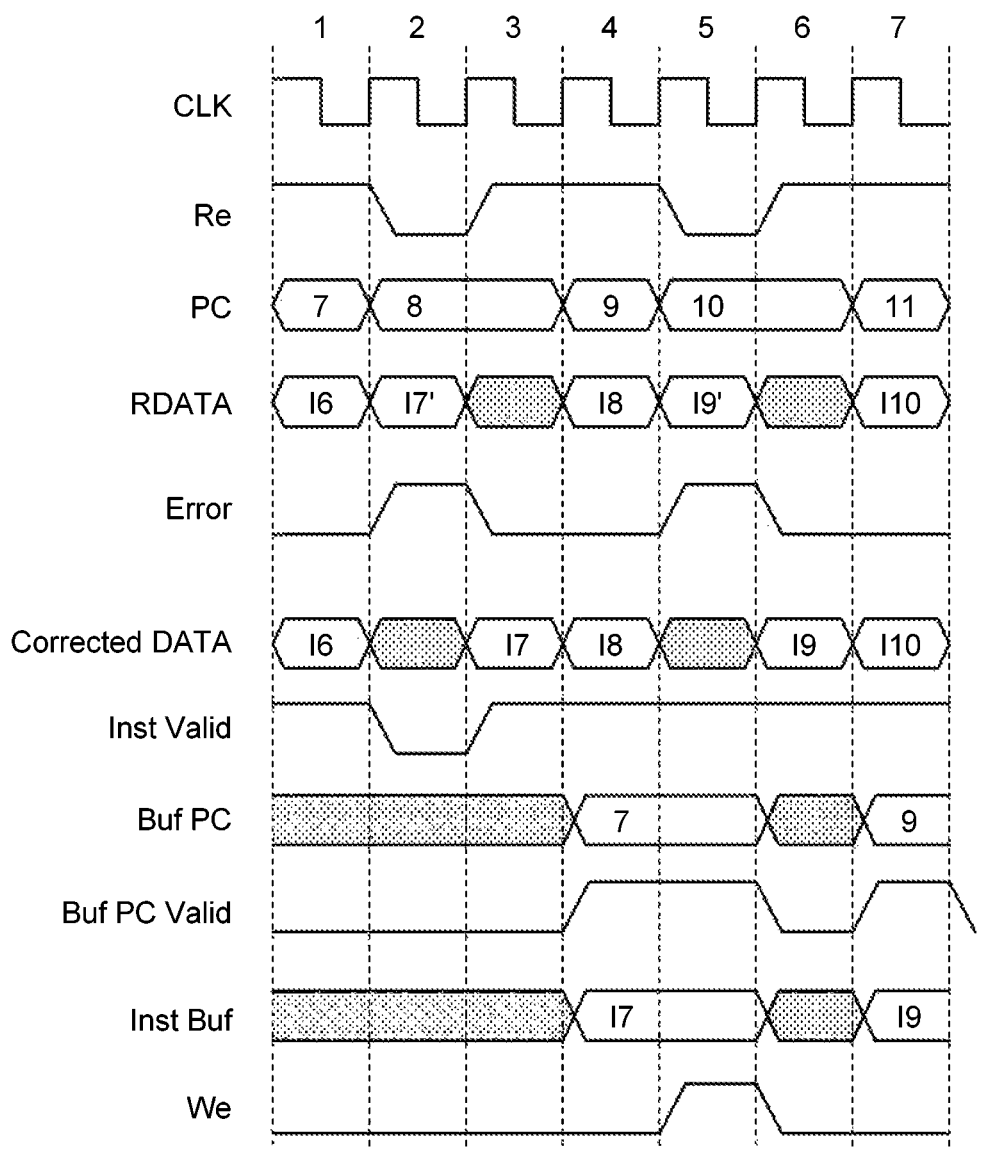
FIG. 5 is a diagram illustrating an example of a timing chart of an instruction fetch stage according to a second embodiment.

FIG. 5 illustrates a timing chart of the operation according to the embodiment. Assume that a correctable error occurs in reading when PC=7 in the first cycle and PC=9 in the fourth cycle. In the second cycle during which an instruction of PC=7 would have been read unless the error occurred, the instruction valid signal (Inst Valid) is deasserted only for one cycle, and the corrected instruction is held in the instruction buffer 301. The operation up to this point is the same as the first embodiment. In this state, if the instruction of PC=9 is read, and an error is detected in the fifth cycle, the read enable signal (Re: Read enable) is deasserted in the same fifth cycle to stop reading an instruction during the sixth cycle. The sixth cycle is used to write the corrected instruction (I7) of PC=7 into the instruction RAM 101. The address signal (Addr) that has outputted the value of the PC buffer 302 via the instruction fetch control unit 204 is used for a write address. A corrected instruction (I9) of PC=9 is determined in the sixth cycle and held in the emptied instruction buffer 301 in the seventh cycle, and the PC buffer 302 is caused to hold the address "9." Afterwards, when the same instruction (PC=9) is read (a similar case to the first embodiment), or when an error occurs at a PC different from PC=9 (a similar case to the embodiment), it is sufficient if the corrected instruction is written into the instruction RAM 101.

In this manner, even if a correctable error occurs in an instruction of a different PC, a similar effect to the first embodiment can be obtained.

The instruction fetch stage 10 according to the embodiment writes an instruction after error correction into the buffer, and writes the corrected instruction held in the buffer back into the memory when a read error of another instruction occurs and accordingly the accumulation of errors is avoided. Consequently, it is possible to reduce a pipeline stall cycle per error-occurred instruction, which has conventionally required two cycles, to one cycle even if a single-port SRAM remains to be used as the instruction RAM. Moreover, it is possible to deal with a plurality of errors although only one instruction buffer is added.

When detecting a correctable bit error, the instruction fetch stage 10 according to the embodiment does not immediately write the corrected instruction back into the memory (instruction RAM) but holds it in the buffer. The operation of writing the corrected instruction in the buffer back into the memory is performed when the corrected instruction is required by the pipeline or when a bit error occurs in another instruction call and an instruction from the memory is stopped. Consequently, it is possible to achieve the avoidance of the accumulation of errors in the memory without stopping the pipeline that continuously calls instructions except in a cycle during which a bit error is detected.

Third Embodiment

Figure 7:
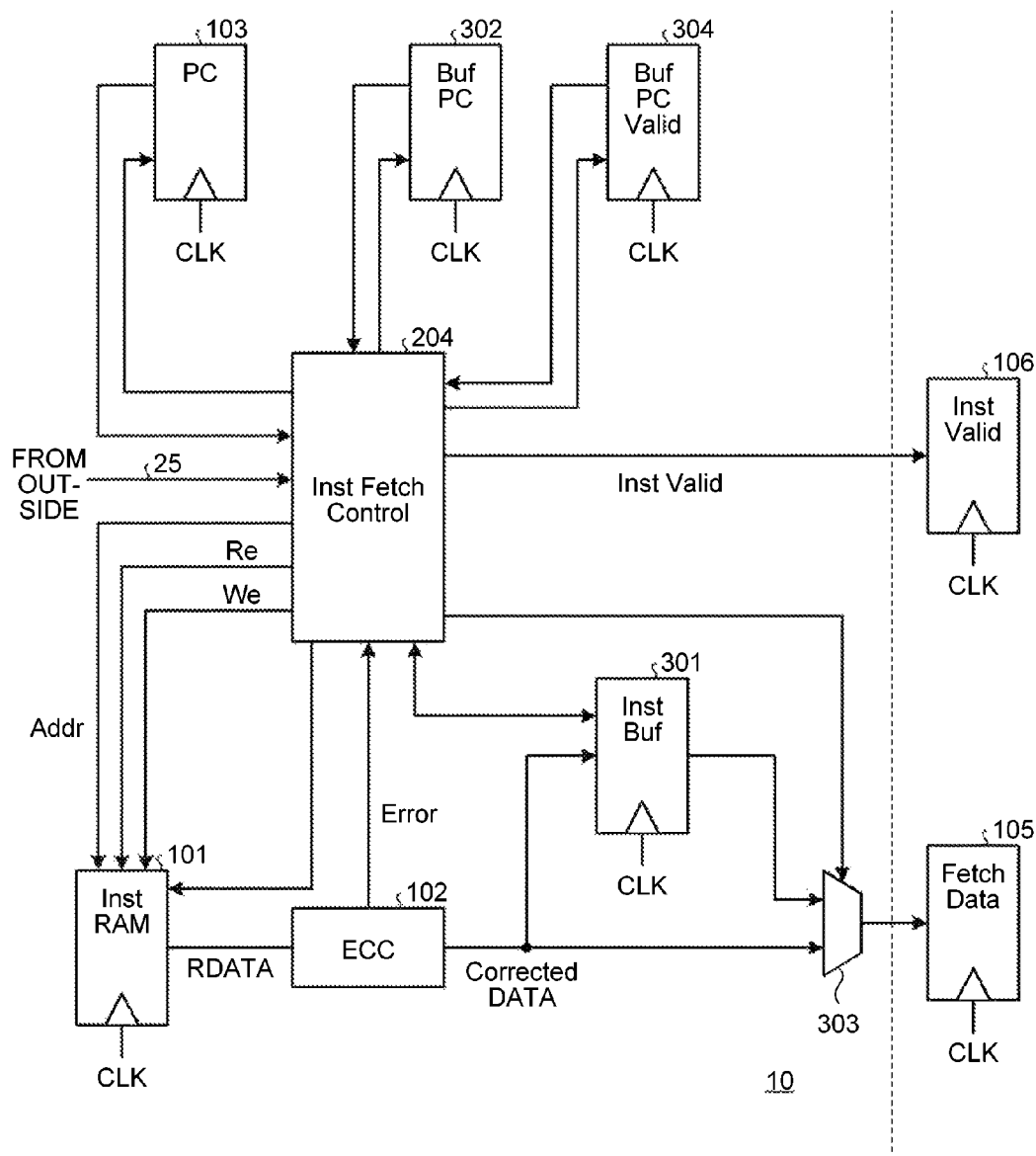
FIG. 7 is a circuit block of an instruction fetch stage of a processor having a pipeline structure according to a third embodiment.
Figure 8:
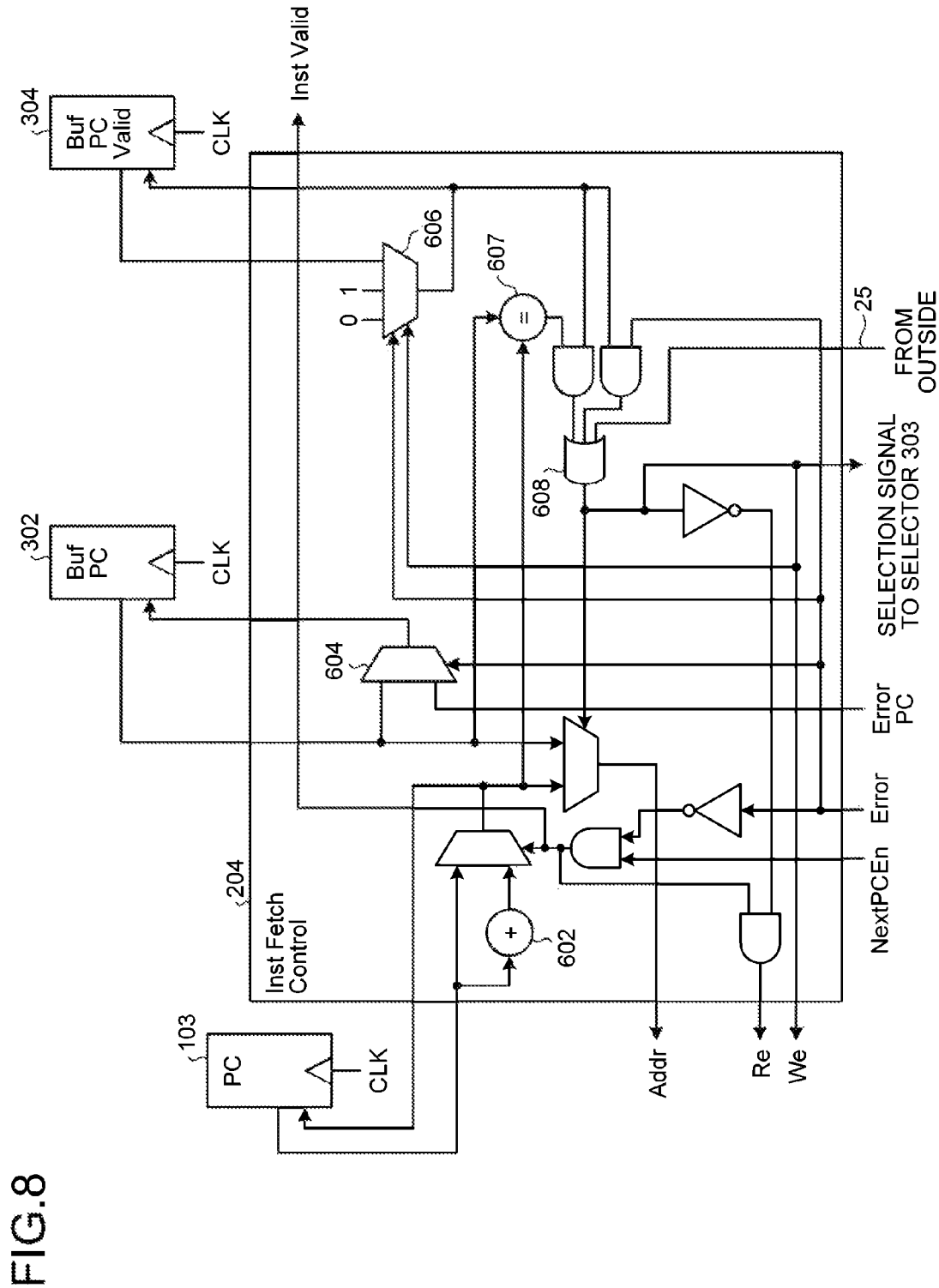
FIG. 8 is a diagram illustrating a detailed configuration of an instruction fetch control unit according to the third embodiment.

FIG. 7 is a circuit block of the instruction fetch stage 10 of a processor having a pipeline structure according to a third embodiment. FIG. 8 is a diagram illustrating a detailed configuration of the instruction fetch control unit 204 according to the third embodiment. In FIGS. 7 and 8, a write-back request signal line 25 from the outside is added to FIGS. 3 and 6.

In the embodiment, the value indicated by the PC 103 is a logical address. In such a system, corrected instruction data of the instruction buffer 301 is written back into the instruction RAM 101 at a timing to perform a context switch by a request of an Operating System (OS), and the like, and by a special instruction explicitly executed by a code (user), when BufPC Valid=1. In other words, when the values of the PC 103 and the PC buffer 302 in the first embodiment agree as a condition that the write enable signal (We) can be asserted, the write enable signal (We) is forced to be asserted from the outside via the write-back request signal line 25 in addition to error occurrence in another address in the second embodiment and accordingly the data of the instruction buffer 301 is written back into the instruction RAM 101. It is conceivable that the instructions from the outside include an instruction to request write-back, a supervisor call, and the like. Therefore, the outside indicates a subsequent stage of the pipeline and the outside of the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing unit comprising:
   an instruction memory configured to hold a plurality of instructions specified by addresses, and to unexecute read and write operations concurrently;
   an error correction circuit configured to detect and correct an error in the instruction read from the instruction memory;
   a program counter configured to specify the address of instruction memory;
   an instruction buffer configured to hold the instruction corrected by the error correction circuit as a corrected instruction;
   a program counter buffer configured to hold an address of the instruction where an error has been detected in the error correction circuit;
   a selector configured to select and output one of an output of the error correction circuit and an output of the instruction buffer; and
   a control unit configured to control read and write of the instruction specified by the address from and into the instruction memory,
   wherein the control unit writes the corrected instruction in the instruction memory using an address held in the program counter buffer upon a predetermined condition being satisfied after occurrence of a first error.

2. The processing unit according to claim 1, wherein the control unit writes the corrected instruction in an address held in the program counter buffer of the instruction memory upon the program counter specifying the address held in the program counter buffer after the occurrence of the first error.

3. The processing unit according to claim 2, wherein the control unit causes the selector to select the output of the instruction buffer upon the program counter specifying an address held in the program counter buffer after the occurrence of the first error.

4. The processing unit according to claim 1, wherein the control unit writes the corrected instruction in an address held in the program counter buffer of the instruction memory upon occurrence of a second error after the occurrence of the first error.

5. The processing unit according to claim 2, wherein the control unit writes the corrected instruction in an address held in the program counter buffer of the instruction memory upon occurrence of a second error after the occurrence of the first error.

6. The processing unit according to claim 3, wherein the control unit writes the corrected instruction in an address held in the program counter buffer of the instruction memory upon occurrence of a second error after the occurrence of the first error.

7. The processing unit according to claim 1, further comprising a valid register configured to hold as a state whether or not to be in a valid state where an address of the instruction where an error has been detected in the error correction circuit is stored in the program counter buffer, wherein the control unit activates the valid register upon the occurrence of the first error, and writes the corrected instruction in an address held in the program counter buffer of the instruction memory upon the valid register being valid.

8. The processing unit according to claim 2, further comprising a valid register configured to hold as a state whether or not to be in a valid state where an address of the instruction where an error has been detected in the error correction circuit is stored in the program counter buffer, wherein the control unit activates the valid register upon the occurrence of the first error, and writes the corrected instruction in an address held in the program counter buffer of the instruction memory upon the valid register being valid.

9. The processing unit according to claim 4, further comprising a valid register configured to hold as a state whether or not to be in a valid state where an address of the instruction where an error has been detected in the error correction circuit is stored in the program counter buffer, wherein the control unit activates the valid register upon the occurrence of the first error, and writes the corrected instruction in an address held in the program counter buffer of the instruction memory upon the valid register being valid.

10. The processing unit according to claim 5, further comprising a valid register configured to hold as a state whether or not to be in a valid state where an address of the instruction where an error has been detected in the error correction circuit is stored in the program counter buffer, wherein the control unit activates the valid register upon the occurrence of the first error, and writes the corrected instruction in an address held in the program counter buffer of the instruction memory upon the valid register being valid.

11. An error processing method in a processing unit including:
an instruction memory configured to hold a plurality of instructions specified by addresses, and to unexecute read and write operations concurrently;
an error correction circuit configured to detect and correct an error in the instruction read from the instruction memory;
a program counter configured to specify the address of instruction memory;
an instruction buffer configured to hold the instruction corrected by the error correction circuit as a corrected instruction;
a program counter buffer configured to hold an address of the instruction where an error has been detected in the error correction circuit;
a selector configured to select and output one of an output of the error correction circuit and an output of the instruction buffer; and
a control unit configured to control read and write of the instruction specified by the address from and into the instruction memory,
the method comprising writing the corrected instruction in the instruction memory using an address held in the program counter buffer upon a predetermined condition being satisfied after occurrence of a first error.

12. The error processing method according to claim 11, wherein the corrected instruction is written in an address held in the program counter buffer of the instruction memory upon the program counter specifying the address held in the program counter buffer after the occurrence of the first error.

13. The error processing method according to claim 12, wherein the selector is caused to select the output of the instruction buffer upon the program counter specifying an address held in the program counter buffer after the occurrence of the first error.

14. The error processing method according to claim 11, wherein the corrected instruction is written in an address held in the program counter buffer of the instruction memory upon occurrence of a second error after the occurrence of the first error.

15. The error processing method according to claim 12, wherein the corrected instruction is written in an address held in the program counter buffer of the instruction memory upon occurrence of a second error after the occurrence of the first error.

16. The error processing method according to claim 13, wherein the corrected instruction is written in an address held in the program counter buffer of the instruction memory upon occurrence of a second error after the occurrence of the first error.

17. The error processing method according to claim 11, wherein
the processing unit further includes a valid register configured to hold as a state whether or not to be in a valid state where an address of the instruction where an error has been detected in the error correction circuit is stored in the program counter buffer,
the valid register is activated upon the occurrence of the first error, and
the corrected instruction is written in an address held in the program counter buffer of the instruction memory upon the valid register being valid.

18. The error processing method according to claim 12, wherein
the processing unit further includes a valid register configured to hold as a state whether or not to be in a valid state where an address of the instruction where an error has been detected in the error correction circuit is stored in the program counter buffer,
the valid register is activated upon the occurrence of the first error, and
the corrected instruction is written in an address held in the program counter buffer of the instruction memory upon the valid register being valid.

19. The error processing method according to claim 14, wherein
the processing unit further includes a valid register configured to hold as a state whether or not to be in a valid state where an address of the instruction where an error has been detected in the error correction circuit is stored in the program counter buffer, the valid register is activated upon the occurrence of the first error, and the corrected instruction is written in an address held in the program counter buffer of the instruction memory upon the valid register being valid.

20. The error processing method according to claim 15, wherein the processing unit further includes a valid register configured to hold as a state whether or not to be in a valid state where an address of the instruction where an error has been detected in the error correction circuit is stored in the program counter buffer, the valid register is activated upon the occurrence of the first error, and the corrected instruction is written in an address held in the program counter buffer of the instruction memory upon the valid register being valid.

\* \* \* \* \*